United States Patent
Troesch

(10) Patent No.: US 10,255,735 B2
(45) Date of Patent: Apr. 9, 2019

(54) ACCESS SYSTEM WITH SUBSTITUTE / ALTERNATIVE FUNCTION

(71) Applicant: INVENTIO AG, Hergiswil (CH)

(72) Inventor: Florian Troesch, Zurich (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 16/065,412

(22) PCT Filed: Dec. 19, 2016

(86) PCT No.: PCT/EP2016/081799
§ 371 (c)(1),
(2) Date: Jun. 22, 2018

(87) PCT Pub. No.: WO2017/108719
PCT Pub. Date: Jun. 29, 2017

(65) Prior Publication Data
US 2019/0012858 A1    Jan. 10, 2019

(30) Foreign Application Priority Data

Dec. 23, 2015   (EP) ................................ 15202543

(51) Int. Cl.
    *G07C 9/00*    (2006.01)
(52) U.S. Cl.
    CPC ...... *G07C 9/00111* (2013.01); *G07C 9/00103* (2013.01); *G07C 9/00309* (2013.01)
(58) Field of Classification Search
    None
    See application file for complete search history.

(56) References Cited

U.S. PATENT DOCUMENTS

| 4,979,594 A * | 12/1990 | Begle ..................... B66B 1/468 187/380 |
| 8,819,855 B2 | 8/2014 | Prasad et al. |
| 2009/0120727 A1* | 5/2009 | Hamaji ................... B66B 1/468 187/391 |
| 2012/0234058 A1* | 9/2012 | Neil ................... G07C 9/00571 70/91 |

FOREIGN PATENT DOCUMENTS

| EP | 2779118 A1 | 9/2014 |
| WO | 2009132690 A1 | 11/2009 |

* cited by examiner

*Primary Examiner* — Carlos Garcia
(74) *Attorney, Agent, or Firm* — Baker & Hostetler LLP

(57) ABSTRACT

A system for the controlling of entrances comprises a plurality of access control units, wherein each entrance is allocated an access control unit with a data acquisition device assigned to it. The access control units are coupled to a control device via a network. An error signal is detected in the system which indicates that a first data acquisition device at a first entrance is not ready for operation and is unable to capture authorization data of a person wishing to gain access at the first entrance. A data signal is produced by a second data acquisition device at a second entrance, when the second data acquisition device captures the authorization data of the person wishing to gain access at the first entrance. In the system an activation signal is sent to the access control unit at the first entrance, in order to release the first entrance and grant the person access.

13 Claims, 3 Drawing Sheets

ACCESS SYSTEM WITH SUBSTITUTE / ALTERNATIVE FUNCTION

CROSS-REFERENCE TO RELATED APPLICATION

This application is the national phase application under 35 U.S.C. § 371 claiming the benefit of priority based on International Patent Application No. PCT/EP2016/081799, filed on Dec. 19, 2016, which claims the benefit of priority based on European Patent Application No. 15202543.3, filed on Dec. 23, 2015. The contents of each of these applications are herein incorporated by reference.

FIELD OF THE INVENTION

The technology described here relates generally to access control. Exemplary embodiments of the technology particularly relate to a method and a system for operating a control system for entrances, so that only authorized persons are allowed to gain entry at access points.

BACKGROUND OF THE INVENTION

In known exemplary access control systems, doors are fitted with electronic door locks. WO 2013/177443 describes for example an electronic door lock with an input device, which comprises a keyboard, a card reader or a reading device for capturing biometric parameters. The input device captures data of a person, in order to check their access authorization. Moreover, the door lock has a control device which detects tampering or damage and subsequently triggers an alarm, either locally at the door lock or at a remotely disposed control device.

WO 2014/186691 also describes an electronic door lock which can be unlocked for example by means of a magnetic card, an RFID card or a reading device for capturing biometric data. In addition to this, WO 2014/186691 describes a device for transmitting electrical energy to the electrical door lock, in order thereby to create an alternative to batteries with a limited service life.

WO 2013/177443 and WO 2014/186691 describe different solutions in order to improve the availability and functional capability of an electronic door lock. Despite these known solutions, situations may exist in which the availability and functional capability cannot be guaranteed either by an alarm or by the improved power supply. There is therefore a need for additional technology, in order to improve the availability and functional capability of an access control system.

SUMMARY OF THE INVENTION

One aspect of this kind of technology therefore relates to a method for operating a control system for entrances that comprises a plurality of access control units. Each entrance is allocated an access control unit with a data acquisition device assigned to it and the access control units are coupled to a control device via a network. The method comprises detection of an error signal by the control device, wherein the error signal indicates that a first data acquisition device at a first entrance is not ready for operation and is unable to capture authorization data of a person wishing to gain access at the first entrance. The method moreover comprises reception of a data signal by the control device, wherein the data signal is produced by a second data acquisition device at a second entrance, when the second data acquisition device captures the authorization data of the person wishing to gain access at the first entrance. The method furthermore comprises transmission of an activation signal by the control device to the access control unit at the first entrance, in order to release the first entrance and grant the person access.

Another aspect relates to a system for the control of entrances which comprises a plurality of access control units and a control device. Each entrance is allocated an access control unit and each access control unit is assigned a data acquisition device. The control device coupled to the access control units through a network and has a processor with an access control software program that can be run in the processor. During operation, the processor receives an error signal which indicates that a first data acquisition device at a first entrance is not ready for operation and is unable to capture authorisation data of a person wishing to gain access at the first entrance. The processor receives a data signal that is generated by a second data acquisition device at a second entrance when the second data acquisition device captures the authorization data of the person wishing to gain access at the first entrance. The processor sends a control command to the access control unit at the first entrance, in order to release the first entrance and grant the person access.

In some of the exemplary embodiments described here, the technology is based on access control units networked to the control device. It may occur that a data acquisition device (e.g. a reading device for RFID cards) at an entrance fails due to a fault. If a person then tries to enter their home, for example, at this entrance in the usual manner by holding their RFID card onto the reading device, the entrance remains locked. However, the technology allows this person to use another data acquisition device at another entrance, in order to gain access to their home. In this way, availability of the access control system is improved.

In one exemplary embodiment, the second data acquisition device captures authorization data of the person wishing to gain access at the first entrance. The activation signal is generated when the captured authorization data authorize access at the first entrance. In one exemplary embodiment, a check is also made in this case as to whether an identification code contained in the data signal is valid for the first or second entrance. The activation signal is generated if the identification code is valid for the first entrance.

In one exemplary embodiment, a message may be displayed at the first entrance. This message announces that at least the second data acquisition device is available at the second entrance for capturing the authorization data. Depending on the embodiment, the message may also announce that the first data acquisition device is out of operation. The person is therefore not left unclear as to which alternatives are available and the reason for these. A high degree of user-friendliness is thereby achieved.

The technology offers flexibility in terms of the way in which the control device receives status information. In one exemplary embodiment, the control device requests status information from the data acquisition devices, in order to determine therefrom at least one error signal. In another exemplary embodiment, the first data acquisition device sends an error signal to the control device, e.g. as soon as an error occurs and the first data acquisition device is not therefore ready for operation.

There is also flexibility in terms of the implementation of the data acquisition devices present in the system. A data acquisition device may comprise a reading device which can read and/or capture data from magnetic cards, chip cards or RFID cards, data from an optical code which is presented on a carrier material or an electronic display, or biometric data.

Depending on the embodiment, these reading device technologies may also be combined.

In an exemplary embodiment, the entrances may take the shape of doors, barriers, turnstiles and/or revolving doors, depending on the situation. In barriers of this kind, the access control units may comprise electronic locks. These barriers of the access control system may be arranged in a building or in another restricted area.

In further exemplary embodiments, further flexibility results in that the control device may be arranged in the building in which the access system controls the entrance or remote from this building in a service centre. In addition, the control device or respectively the function thereof may be arranged distributed within the building. Through the service centre for example access authorizations for the building can be managed centrally, (e.g. by a property management). The service centre may also recognize faults promptly and arrange for them to be corrected.

BRIEF DESCRIPTION OF THE DRAWINGS

Various aspects of the improved technology are explained in greater detail below with the aid of exemplary embodiments in conjunction with the figures. In the figures, the same elements have the same reference numbers, wherein.

DETAILED DESCRIPTION OF EMBODIMENTS OF THE INVENTION

Figure 1:
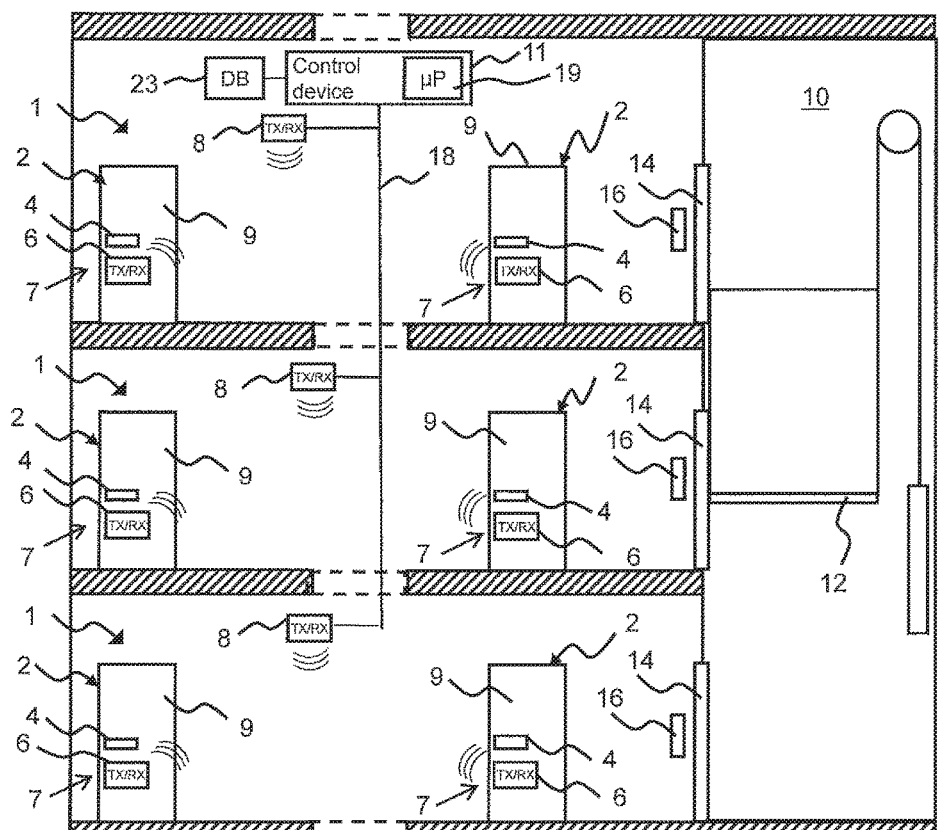
FIG. 1 is a schematic representation of an exemplary situation in a building with a plurality of floors and with an access control system.

FIG. 1 is a schematic representation of an exemplary situation in a building which is equipped with an access control system and has a plurality of floors 1 which are served by a lift system 10. For representation reasons, only one car 12 movable in a shaft is shown of the lift system 10 in FIG. 1, which car can be called by terminals 16 arranged on the floors 1. The shaft is cut off on each floor 1 in a known manner by a shaft door 14. A plurality of entrances 2 (e.g. doors 9 which comprise a door leaf and a door casing/door frame) is shown on each floor 1, said entrances enabling access to apartments, offices or other access-restricted zones or spaces, for example. The person skilled in the art will recognize that an entrance 2 may also be one of possibly a plurality of building entrances, garage entrances and/or property entrances/drives.

In FIG. 1 there is an access control unit 7 at each entrance 2. In the exemplary embodiment shown, each door 9 is fitted with a door handle 4 and a data acquisition device 6, wherein the data acquisition device 6 is assigned to the access control unit 7 and data is captured from a person or a data carrier if the person wishes to gain access at an entrance 2. In an exemplary embodiment, access control units 7 or data acquisition devices 6 may also be arranged at the terminals 16. The access control units 7 are coupled to a control device 11 via a network. The control device 11 can check access authorizations, for example, and, if a person is authorized to enter, can unlock the respective door 9, for example, in order to grant the person access. Alternatively thereto, access authorization can also be checked locally in the access control units 7.

In the situation shown in FIG. 1, the technology described here can be used in an advantageous manner. Summed up briefly and by way of example, the control device 11 may unlock a given (first) door 9 for a person directly or initiate the unlocking thereof, and namely also when, for example, the data acquisition device 6 at this (first) door 9 is not ready for operation due to a fault, for example, and cannot capture data for an authorization check. If an error signal exists for this (first) door 9, information may be provided at the door 9 or the (faulty) data acquisition device 6, for example, to the effect that one or more data acquisition devices 6 are available in the vicinity, in order to gain access at this (first) door 9. These data acquisition devices 6 may belong to one or more doors 9 or the terminals 16. The said information may be in the form of "Please use the data acquisition device at door X or the lift terminal on this floor", for example.

The person can then use a data acquisition device 6 at these (second) doors 9 or terminals 16, in order to have their authorization data captured. If the person then presents their RFID card at the data acquisition device 6 of the second door 9, for example, the control device 11 recognizes that the person at the second door 9 possibly has no access and checks whether status information stored in a data store indicates a breakdown and at which (first) door 9 the data acquisition device 6 is possibly faulty. If access authorization exists for the (first) door 9 at which the data acquisition device 6 is faulty, the control device 11 triggers an unlocking device at this (first) door 9, in order to release it for the person. Further structural and functional details are described below.

In a similar manner, the technology described can also be used when no data acquisition devices 6 are arranged at the doors 9. This may, for example, be the case in a building in which data acquisition devices 6 of this kind are dispensed with at the individual doors 9 for cost reasons, but occupants are nevertheless to be provided with the function of an access control. In a building of this kind, the lift terminals are equipped with data acquisition devices which the occupants can use to gain access to their apartments. For example, an occupant can hold their RFID card onto a data acquisition device at a lift terminal in order to open their apartment door. In one embodiment, the occupant may also be prompted to input which door is to be opened. The input prompt may take place by a message on a user interface display, and the door may be identified by an apartment number or a name. If, after inputting this information, the occupant holds his RFID card onto the data acquisition device, the input is confirmed and, if authorization exists, the desired door is opened. If the occupant should have access to several doors or apartments, this embodiment can prevent several doors from being opened at the same time.

Referring again to FIG. 1, in one exemplary embodiment the access control unit 7 is an electronic door lock which is arranged on the door leaf of the door 9. The electrical energy required to operate the electronic door lock may be provided for example by an internal battery or a connection to an external power supply, (e.g. a building's internal power supply system). The data acquisition device 6 may comprise a reading device which can capture data based on different technologies. The reading device can, for example, read data from magnetic cards, chip cards or RFID cards, or data from optical codes (bar codes, QR codes, colour codes) which are printed on different carrier materials or are presented on displays of electronic devices (e.g. mobile phones, smart-phone, tablet). In another exemplary embodiment, the reading device may comprise a reading device for identifying biometric parameters (e.g. samples of fingertips, palm prints or eyes (iris) or voice characteristics).

If Radio Frequency Identification (RFID) technology is used, for example, the reading device is an RFID reader which receives data from an RFID card placed within radio range. The data, comprising an identification code, for example, are stored in a data store of the RFID card. The radio frequency used by the RFID reader and the RFID card is 125 kHz, 13.56 MHz or 2.45 GHz, for example. On the other hand, if an optical technology is used, the reading device is an optical reading device (e.g. a camera or a scanner) which captures the sample of an optical code which is displayed on an electronic device. An exemplary technology for generating and capturing an optical colour code is described in WO 2015/049186. The said cards and electronic devices are designated below as carriers for electronic keys or key carriers. If a person wishes to gain access at a door 9, they bring the key carrier within radio range, for example, which is dependent on the radio technology used, or they position it in front of an optical reading device.

In the exemplary embodiment shown in FIG. 1, the doors 9 allow access to the apartments, offices or other access-restricted zones. The person skilled in the art will recognize that in other exemplary embodiments, barriers, turnstiles, revolving doors or other barriers can be used to allow or block access at an entrance point. In further exemplary embodiments, barriers of this kind can be supplemented or replaced by electronic monitoring devices, for example light barriers, motion sensors or optical devices (3D cameras, video cameras). Depending on the building, alternatives of this kind can also be used in combination.

Different exemplary embodiments are described below by means of a door 9 with an access control unit 7; the person skilled in the art will recognize that instead of the door 9, one or a plurality of the mentioned alternatives can be used. The person skilled in the art will also recognize that the access control unit 7 and/or its data acquisition device 6 can be arranged for example on or in the vicinity of the doors 9, barriers, turnstiles, revolving doors or other barriers. The access control unit 7 and/or the data acquisition device 6 may also be arranged in or on the terminal 16 which serves for calling a lift. If the data acquisition device 6 recognizes an authorized person, the door 9 or one of the mentioned alternatives is unlocked by activating an unlocking device, for example, so that the door 9 can be opened and access granted. The unlocking device may be present in or on the door 9, for example, and may comprise a door latch and/or a bolt which, when the door 9 is closed, engage into a closing plate of a door casing. The unlocking device may also be arranged completely or partially in the door casing.

FIG. 1 moreover shows the control device 11 in which a processor 19 (µP) is arranged, and a plurality of communications devices 8 which are coupled to the control device 11. A database 23 (DB) which is shown is coupled to the control device 11; the database 23 may also be arranged in the control device 11. In the exemplary embodiment shown, a communications device 8 is shown on each floor 1, wherein each communications device 8 is connected to the control device 11 via a (line-bound) data bus 18. The communication between the control device 11 and the individual communications devices 8 takes place in a fixed network of this kind according to a protocol for line-bound communication via the data bus 18, for example the LonTalk protocol, if the data bus 18 is based on the LON standard (LON: Local Operating Network). The person skilled in the art will recognize, moreover, that as an alternative to a bus, each communications device 8 can be connected to the control device 11 via a separate line.

In another exemplary embodiment, communication can take place via a radio network. In this case, the control device 11 and the communications devices 8 are fitted with corresponding radio transmitters and radio receivers. Known radio networks are, for example, ZigBee according to standard IEEE 802.15.4, Wireless Local Area Network (WLAN) according to standard IEEE802.11, Worldwide Interoperability for Microwave Access (WIMAX) according to standard IEEE802.16 with a range of several 100 meters to several 10's of kilometers. The radio frequency used by the radio network in the case of a WLAN, for example, lies in the 2.4 GHz band or in the 5.0 GHz band, and in the case of WIMAX in the 10 to 66 GHz band. Both the fixed network and also the radio network allow a bidirectional communication according to known network protocols such as the Transmission Control Protocol/Internet-Protocol (TCP/IP) or Internet Packet Exchange (IPX).

In FIG. 1, the control device 11 is installed in the building. The person skilled in the art will recognize that the control device 11 can also be installed outside the building, for example in a remotely arranged service centre. In a case of this kind, the communication takes place between the control device 11 and different units and devices in the building via a communication network (e.g. the Internet and/or a WAN).

The communications devices 8 are not only able to communicate with the control device 11, but also with the access control units 7, for example with their data acquisition devices 6. In one exemplary embodiment, the communication takes place by radio, which is indicated by a symbol for radio waves in FIG. 1. This radio communication may also take place on one of the mentioned standards for radio networks. A radio communication is particularly advantageous when the data acquisition device 6 is attached to a movable door leaf and the laying of lines there is associated with greater expense under certain circumstances. In one exemplary embodiment, each access control unit 7 has a radio transmitter and radio receiver which communicate with correspondingly equipped communications devices 8. In another exemplary embodiment, the communication between the communications devices 8 and the access control units 7 may also be line-bound.

Irrespective of how the communication takes place between the access control units 7 and the communication devices 8 or respectively the control device 11, i.e. by radio or via lines, each access control unit 7 in the building is identifiable, for example due to hard-wired connection lines (e.g. via a fixed connection to the control device 11) or by an individual address or identifier. The control device 11 can thereby detect, when receiving a corresponding signal, for example, at which door 9 access is currently sought or which door is to be opened after an access authorization check has been carried out.

Figure 2:
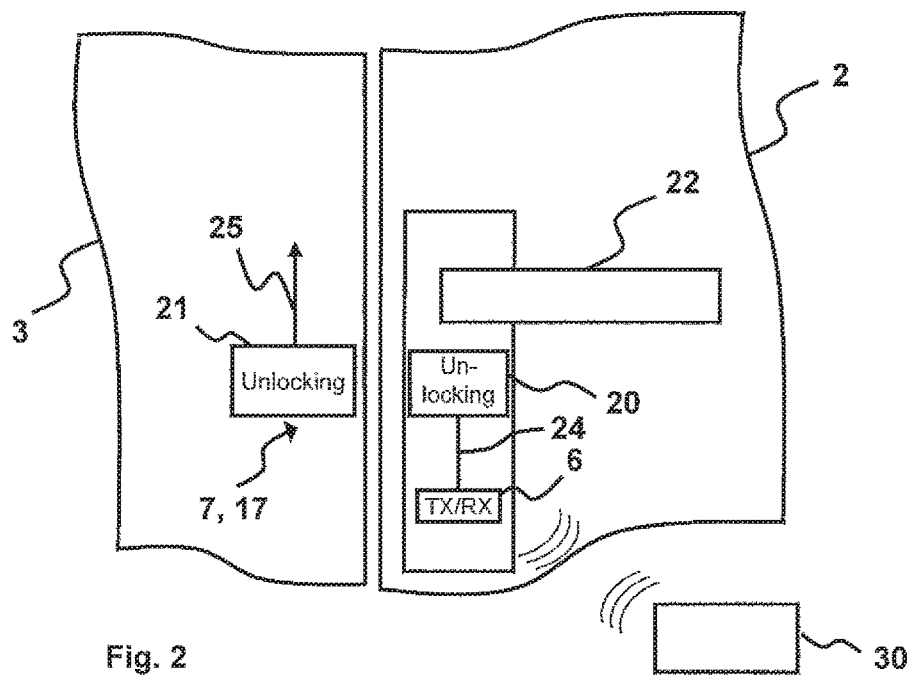
FIG. 2 is a schematic representation of a first exemplary embodiment of an electronic lock.

FIG. 2 shows an exemplary embodiment of an access control unit 7, particularly of an electronic lock 17 with a push button 22, such as one that can be used on the doors 9. The person skilled in the art will recognize that instead of the push button 22 another grip possibility may also be present, for example a door knob, in order to open the door 9. For representation reasons, a strike plate that may be present and a door latch are not shown.

On the door leaf side, FIG. 2 moreover shows the data acquisition device 6 and an unlocking device 20 which is coupled via a connection 24 to the data acquisition device 6.

The data acquisition device 6 is provided for a communication with a key carrier 30 based on one of the aforementioned radio technologies, e.g. RFID technology. The data acquisition device 6 has a transmitter and receiver (TX/RX) for this purpose and the key carrier 30 has a transponder according to RFID technology.

Figure 3:
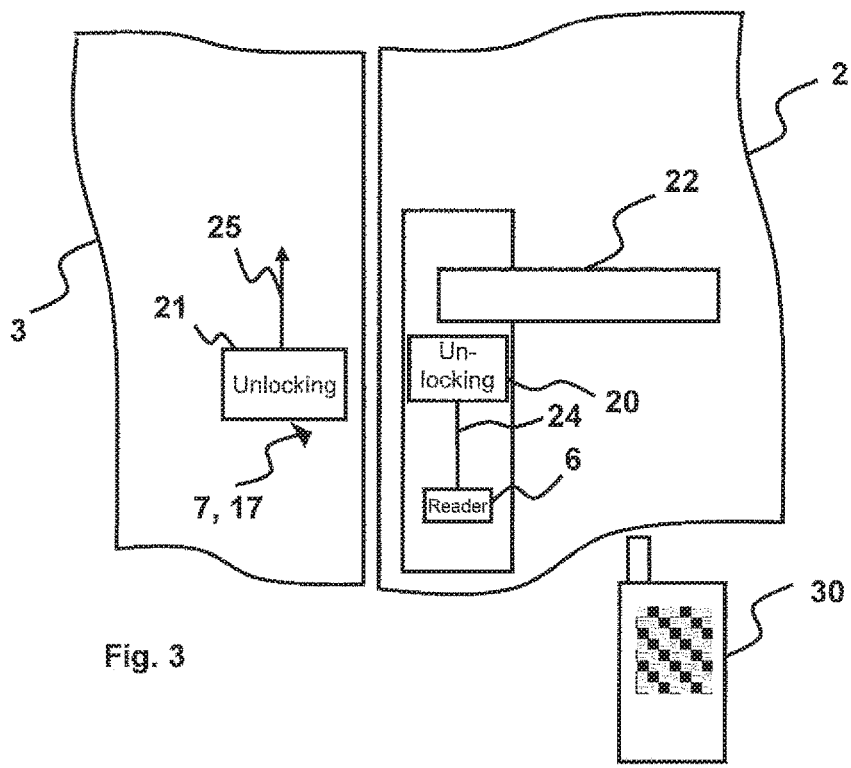
FIG. 3 is a schematic representation of a second exemplary embodiment of an electronic lock.

FIG. 3 shows a further exemplary embodiment of an electronic lock 7 in which the data acquisition device 6, compared with the exemplary embodiment in FIG. 2, exhibits a reading device (reader) which can read an optical code from the key carrier 30. The key carrier 30 may be a smart phone, for example, which shows a code sample indicated schematically in FIG. 3 on a display.

In addition to a door leaf part of the door 9, FIGS. 2 and 3 show a part of a door casing 3 which is integrated into a building wall, for example, and contains an unlocking device 21. The unlocking device 21 is optional, as depending on the configuration of the electronic door lock 7, the door casing 3 or the door leaf of the door 9 may contain an unlocking device (20, 21). If the unlocking device 21 is present, the unlocking device 21 can be activated via a connection line 25.

The person skilled in the art will recognize that the unlocking device 20 can be combined with the data acquisition device 6 to create a unit. The person skilled in the art will recognize, moreover, that the data acquisition device 6 can also be arranged on or in the vicinity of the door casing 3. If the data acquisition device 6 is arranged on the door casing 3, it can also be combined with the unlocking device 21 to create a unit.

The unlocking devices 20, 21 have an electromechanical mechanism which in one exemplary embodiment contains an electromagnetically activatable barrier or an electromagnetically activatable bar or bolt. In another exemplary embodiment, the electromechanical mechanism may comprise an electric motor which drives a bar or bolt. The electric motor may, for example, push the bolt into the striking plate of the door casing 3 and pull it out of the same. The electromechanical mechanism may be activated by a control signal (hereinafter also designated as the activation signal) which is generated for example by the data acquisition device 6 or the control device 11.

Having understood the fundamental system components described above and the functionalities thereof, a description of an exemplary method for operating a system for controlling entrances 2 is given below with the aid of FIG. 4. The description is provided with reference to a person seeking to gain access at an entrance 2, to their apartment for example.

Figure 4:
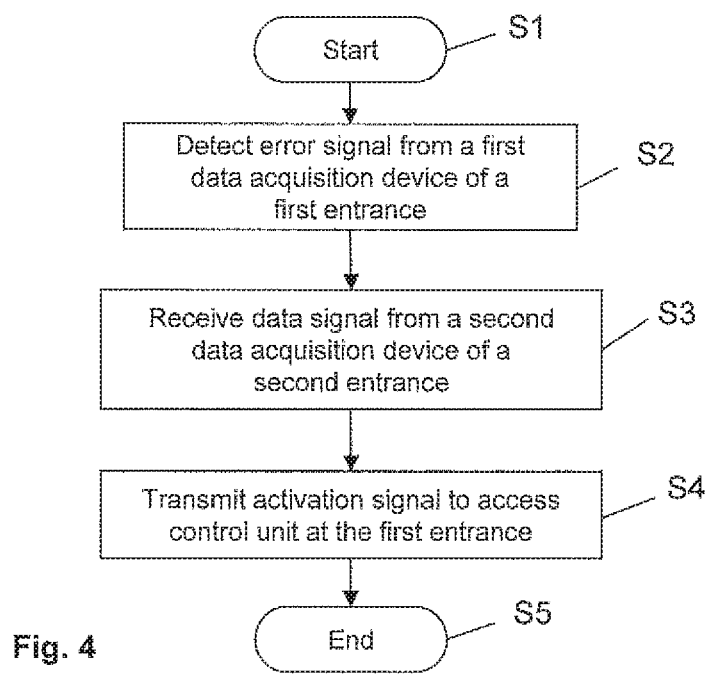
FIG. 4 is an exemplary representation of a method for access control by means of a schematic flow chart.

In order for a person to identify themselves as being authorized to gain access through entrance 2 in the exemplary embodiment according to FIG. 4, they hold one of the aforementioned key carriers 30 to the electronic lock 17 of their (apartment) door 9. The exemplary method is controlled by the processor 19 of the control device 11, in which a software program provided therefor is executed. The method begins in a step S1 and ends in a step S5.

In a step S2, the processor 19 of the control device 11 detects an error signal from a data acquisition device 6 which is arranged at an entrance 2 and is not ready for operation on account of a fault. This faulty data acquisition device 6 is designated below as the first data acquisition device 6 and the assigned entrance 2 is designated as the first entrance 2. The error signal indicates that the first data acquisition device 6 at the first entrance 2 is not ready for operation and cannot capture any authorization data of a person wishing to gain access at the first entrance 2. In the exemplary embodiment described here, it is assumed that other components of the access control device 7 or respectively of the electronic lock 17 are functional.

In one exemplary embodiment, the processor 19 may request status information from the data acquisition devices 6 at regular intervals. If the status information of a data acquisition device 6 is absent, this is interpreted as an error signal and the data acquisition device 6 concerned is classified as non-operational. In another exemplary embodiment, each access control device 7 or respectively each electronic lock 17 can detect the state of the data acquisition device 6 assigned to it and, in the event of a fault, send an error signal to the control device 11.

If, during a breakdown of this kind, the person holds their key carrier 30 to the first data acquisition device 6, the authorization data are not captured and the entrance 2 remains locked. If the first data acquisition device 6 is not ready for operation, this can be indicated on the first data acquisition device 6 or on the electronic lock 17. A display device may present a symbol, text (e.g. "Out of operation") and/or light signals, for example. Depending on the exemplary embodiment, the display device may, moreover, display a message informing the person that one or more data acquisition devices 6 in the vicinity can be used, in order to gain access at this first entrance 2. A message of this kind may be dispensed with under certain circumstances, if the person is already familiar with the procedure in the event of this kind of breakdown.

If the person follows the instruction to use a data acquisition device 6 in the vicinity, they hold their key carrier 30 to a second data acquisition device 6 at a second entrance 2. Depending on the number of data acquisition devices 6 arranged in the vicinity, the person may possibly choose one out of several possibilities. The data acquisition device 6 captures authorization data from the key carrier 30, for example an identification code, which in an exemplary embodiment are only valid for the first entrance 2, but not for the second entrance 2.

In a step S3, the processor 19 then receives a data signal which is produced by the second data acquisition device 6 at the second entrance 2. The data signal is produced when the second data acquisition device 6 captures the authorization data of the person seeking to gain access at the first entrance 2. In an exemplary embodiment, the data signal comprises the identification code captured by the key carrier 30.

The control device 11 checks whether the identification code is valid for the second entrance 2. The identification code is valid for the second entrance 2 when it is assigned to the second entrance 2 in the database 23. In the database 23, a data set (profile) can be created for each entrance 2, for example. A data set of this kind may, for example, comprise the name of an authorized person and the identification code assigned to them. An entrance 2 may also be assigned a plurality of authorized persons.

In the case described here, the identification code is not valid for the second entrance 2 and the second entrance 2 remains locked to the person. On account of the breakdown detected in step S2 at the first entrance 2, the control device 11 moreover checks whether the identification code is valid for the first entrance 2, i.e. it must be assigned to the first entrance 2 in the database. If this is the case, the method moves on to a step S4. Otherwise, none of the entrances 2 is released for the person and the method comes to an end.

In step S4, the control device 11 transmits an activation signal to the access control unit 7 or respectively the electronic lock 17 at the first entrance, in order to release the first entrance 2 for the person to gain access. The control device 11 generates the activation signal when the identification code checked in conjunction with step S3 is valid for the first entrance 2. The activation signal triggers the unlocking device 20, 21 shown in FIG. 2 and FIG. 3, which then releases the locking of the electronic lock 17.

The invention claimed is:

1. A method for operating a system for the control of entrances that comprises a plurality of access control units, wherein each entrance is allocated an access control unit with a data acquisition device assigned to it and wherein the access control units are coupled to a control device via a network, the method comprising:
   detecting an error signal by the control device, wherein the error signal indicates that a first data acquisition device at a first entrance is not ready for operation and is unable to capture authorization data of a person wishing to gain access at the first entrance;
   receiving a data signal by the control device, wherein the data signal is produced by a second data acquisition device at a second entrance, when the second data acquisition device captures the authorization data of the person wishing to gain access at the first entrance; and
   transmitting an activation signal by the control device to the access control unit at the first entrance, in order to release the first entrance and grant the person access.

2. The method according to claim 1, in which the activation signal is generated when the authorization data captured by the second data acquisition device authorizes the person seeking to gain access at the first entrance to enter at the first entrance.

3. The method according to claim 1, further comprising the display of a message at the first entrance indicating that at least the second data acquisition device is available at the second entrance for capturing the authorization data.

4. The method according to claim 1, further comprising:
   requesting status information from the data acquisition devices by the control device, in order to determine at least one error signal therefrom.

5. The method according to claim 1, further comprising the transmission of the error signal by the first data transmission device at the first entrance when the first data acquisition device is not ready for operation.

6. The method according to claim 1, further comprising:
   checking an identification code contained in the data signal as to whether it is valid for the first or second entrance; and
   generating the activation signal if the identification code is valid for the first entrance.

7. A system for controlling entrances, the system comprising:
   a plurality of access control units, wherein each entrance is allocated an access control unit and wherein each access control unit is assigned a data acquisition device; and
   a control device which is coupled to the access control units by a network and comprises a processor with a software program for access control that can be run in the processor, wherein during operation the processor:
      receives an error signal that indicates that a first data acquisition device at a first entrance is not ready for operation and cannot capture any authorization data of a person wishing to gain access at the first entrance,
      receives a data signal that is generated by a second data acquisition device at a second entrance when the second data acquisition device captures the authorization data of the person wishing to gain access at the first entrance, and
      sends a control command to the access control unit at the first entrance, in order to release the first entrance and grant the person access.

8. The system according to claim 7, in which the access control unit comprises an electronic lock.

9. The system according to claim 7, in which the data acquisition device comprises a reading device, wherein the reading device is provided to:
   read data from magnetic cards, chip cards or RFID cards,
   capture data from an optical code which is presented on a carrier material or an electronic display, or
   capture biometric data.

10. The system according to claim 7, further comprising a database which is communicatively coupled to the processor and comprises at least one data set in which an access authorization is assigned to an entrance.

11. The system according to claim 7, in which the entrances are configured as doors, barriers, turnstiles or revolving doors.

12. The system according to claim 11, in which the doors, barriers, turnstiles or revolving doors are arranged in a building and in which the control device is arranged in the building.

13. The system according to claim 11, in which the doors, barriers, turnstiles or revolving doors are arranged in a building and in which the control device is arranged remote from the building in a service centre.

* * * * *